(12) United States Patent
Griffin et al.

(10) Patent No.: US 12,524,700 B2
(45) Date of Patent: Jan. 13, 2026

(54) GENERATING VALIDATED QUANTUM FUNCTION INVOCATIONS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 1024 days.

(21) Appl. No.: 17/586,377

(22) Filed: Jan. 27, 2022

(65) Prior Publication Data
US 2023/0289648 A1    Sep. 14, 2023

(51) Int. Cl.
*G06N 10/80* (2022.01)
*G06F 30/20* (2020.01)

(52) U.S. Cl.
CPC ............. *G06N 10/80* (2022.01); *G06F 30/20* (2020.01)

(58) Field of Classification Search
CPC ......... G06N 10/80; G06N 10/20; G06F 30/20
See application file for complete search history.

(56) References Cited

U.S. PATENT DOCUMENTS

| | | | |
|---|---|---|---|
| 11,074,519 B2 | 7/2021 | Hu et al. | |
| 11,494,681 B1 * | 11/2022 | Peterson | G06N 10/80 |
| 2020/0074346 A1 * | 3/2020 | Griffin | G06N 10/80 |
| 2020/0117764 A1 * | 4/2020 | Zuccarelli | G06N 10/60 |
| 2021/0012233 A1 | 1/2021 | Gambetta et al. | |
| 2021/0019132 A1 | 1/2021 | Gambetta et al. | |
| 2021/0097419 A1 | 4/2021 | Limberg et al. | |

OTHER PUBLICATIONS

Fu X, Riesebos L, Rol MA, Van Straten J, Van Someren J, Khammassi N, Ashraf I, Vermeulen RF, Newsum V, Loh KK, De Sterke JC. eQASM: An executable quantum instruction set architecture. In2019 IEEE International Symposium on High Performance Computer Architecture (HPCA) Feb. 16, 2019 (pp. 224-237). IEEE. (Year: 2019).*

Fu, X. et al., "eQASM: An Executable Qantum Instruction Set Architecture," Proceedings of the 25th International Symposium on High-Performance Computer Architecture (HPCA'19), arXiv:1808.02449v3 [cs.AR], Mar. 9, 2019, https://arxiv.org/pdf/1808.02449.pdf, 14 pages.

J, Abhijith et al., "Quantum Algorithm Implementations for Beginners," arXiv:1804.03719v2 [cs.ET], Mar. 18, 2020, https://arxiv.org/pdf/1804.03719.pdf, 94 pages.

* cited by examiner

*Primary Examiner* — Chuen-Meei Gan
(74) *Attorney, Agent, or Firm* — Dority & Manning, P.A.

(57) ABSTRACT

Generating validated quantum function invocations is disclosed herein. In one example, a processor device of a first quantum computing device receives, from a second quantum computing device, a first indication of a quantum function provided by the second quantum computing device and a second indication of the second quantum computing device's current ability to provide the quantum function. The processor device generates a service definition file based on the first indication and the second indication, wherein the service definition file comprises a quantum instruction sequence for invoking the quantum function of the second quantum computing device. The processor device next executes the service definition file using a quantum simulator, and determines, based on the executing, that the quantum instruction sequence is valid. The processor device then stores the quantum instruction sequence as a validated quantum function invocation.

20 Claims, 7 Drawing Sheets

GENERATING VALIDATED QUANTUM FUNCTION INVOCATIONS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices to provide desired functionality. As quantum computing continues to increase in popularity and become more commonplace, functionality for facilitating rapid development of quantum services will be desirable.

SUMMARY

The examples disclosed herein generate validated quantum function invocations in quantum computer systems. In one example, a validation service, executing on a first quantum computing device, provides a mechanism by which a quantum function provided by a second quantum computing device can be identified, and a quantum instruction sequence for invoking the quantum function can be determined, validated, and stored for subsequent use in accessing the quantum function. In this manner, machine-specific validated quantum function invocations can be generated to enable faster and more reliable development of quantum services.

In another example, a method for generating validated quantum function invocations is disclosed. The method comprises receiving, by a first quantum computing device from a second quantum computing device, a first indication of a quantum function provided by the second quantum computing device and a second indication of the second quantum computing device's current ability to provide the quantum function. The method further comprises generating a service definition file based on the first indication and the second indication, wherein the service definition file comprises a quantum instruction sequence for invoking the quantum function of the second quantum computing device. The method also comprises executing the service definition file using a quantum simulator. The method additionally comprises determining, based on the executing, that the quantum instruction sequence is valid. The method further comprises storing the quantum instruction sequence as a validated quantum function invocation.

In another example, a quantum computing system for generating validated quantum function invocations is disclosed. The quantum computing system includes a first quantum computing device that comprises a first system memory, and a first processor device communicatively coupled to the first system memory. The first processor device is to receive, from a second quantum computing device, a first indication of a quantum function provided by the second quantum computing device and a second indication of the second quantum computing device's current ability to provide the quantum function. The first processor device is further to generate a service definition file based on the first indication and the second indication, wherein the service definition file comprises a quantum instruction sequence for invoking the quantum function of the second quantum computing device. The first processor device is also to execute the service definition file using a quantum simulator. The first processor device is additionally to determine, based on the executing, that the quantum instruction sequence is valid. The first processor device is further to store the quantum instruction sequence as a validated quantum function invocation.

In another example, a non-transitory computer-readable medium for generating validated quantum function invocations is disclosed. The non-transitory computer-readable medium stores thereon computer-executable instructions that, when executed, cause one or more processor devices to receive, by a first quantum computing device from a second quantum computing device, a first indication of a quantum function provided by the second quantum computing device and a second indication of the second quantum computing device's current ability to provide the quantum function. The computer-executable instructions further cause the one or more processor devices to generate a service definition file based on the first indication and the second indication, wherein the service definition file comprises a quantum instruction sequence for invoking the quantum function of the second quantum computing device. The computer-executable instructions also cause the one or more processor devices to execute the service definition file using a quantum simulator. The computer-executable instructions additionally cause the one or more processor devices to determine, based on the executing, that the quantum instruction sequence is valid. The computer-executable instructions further cause the one or more processor devices to store the quantum instruction sequence as a validated quantum function invocation.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
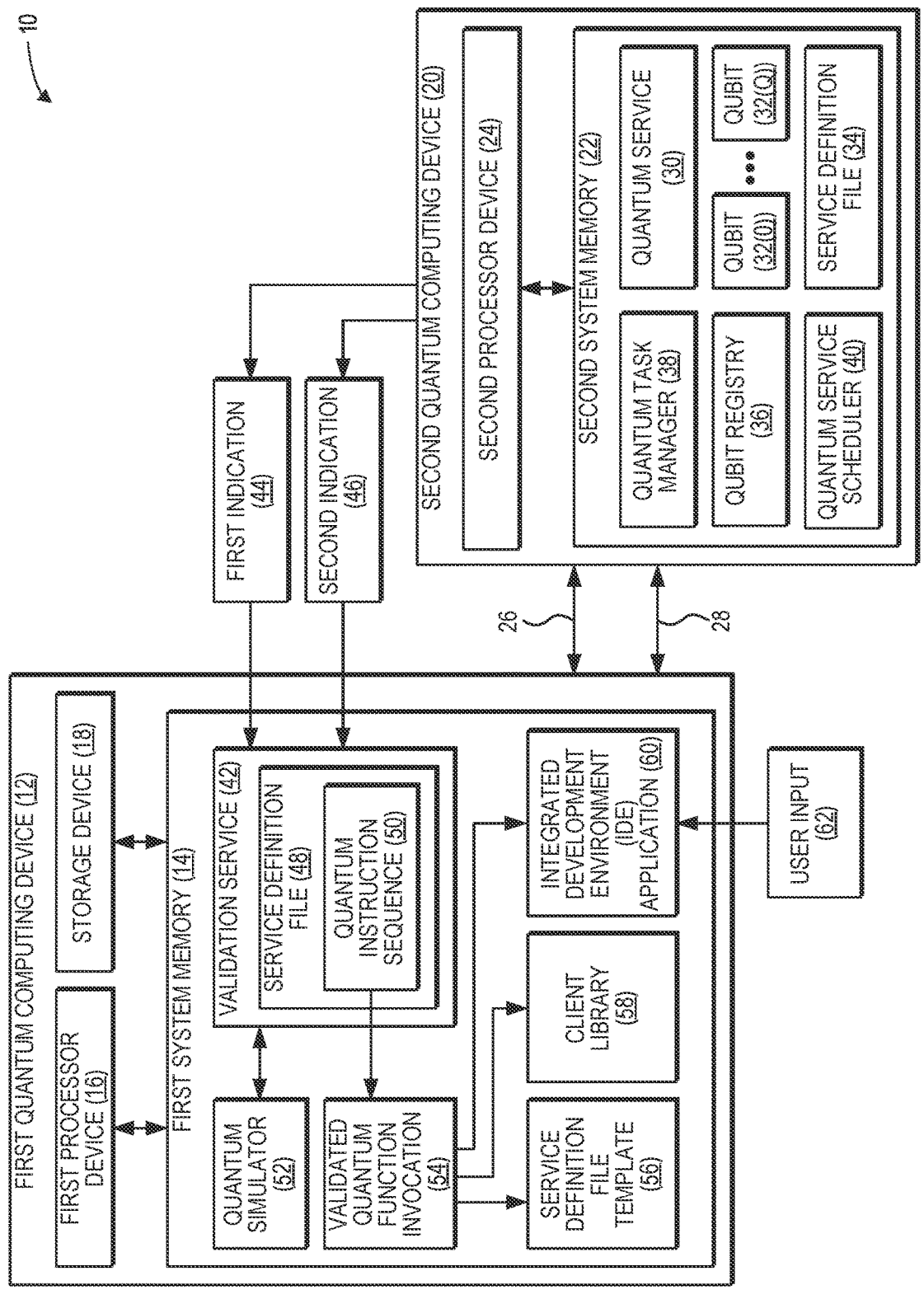
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing devices to provide desired functionality. Conventional approaches to development of a quantum service require an in-depth understanding of both the programming language used for development (e.g., Quantum Assembly (QASM), as a non-limiting example), as well as the quantum functions provided by the specific quantum computing device on which the quantum service will execute. Consequently, development of quantum services may prove challenging in circumstances in which the quantum services under development employ multiple quantum functions and/or target multiple different quantum computing devices.

In this regard, examples disclosed herein implement a validation service for generating validated quantum function invocations. As used herein, the term "validated quantum function invocation" and derivates thereof refer to a sequence of one or more quantum instructions that are used to invoke a quantum function provided by a quantum computing device, and that have been confirmed to successfully execute in a simulated quantum environment. In one example, the validation service, executing on a first quantum computing device, receives, from a second quantum computing device, a first indication of a quantum function provided by the second quantum computing device and a second indication of the second quantum computing device's current ability to provide the quantum function. The quantum function provided by the second quantum computing device may comprise, as non-limiting examples, a gate manipulation function, a qubit allocation function, a quantum service migration function, a qubit data copying function, a qubit teleportation function, or a qubit entanglement function. The first indication may comprise, e.g., an Application Programming Interface (API) or other manifest or menu of quantum functionality provided by the second quantum computing device, and may be received in response to a request from the first quantum computing device to the second quantum computing device or retrieved directly by the first quantum computing device from the second quantum computing device. The second indication may comprise an indication of a current availability of a quantum resource such as qubits, a current availability of processing resources or processor load, and/or a current availability of hardware resources of the second quantum computing device, as non-limiting examples.

Based on the first indication and the second indication, the validation service generates a service definition file that includes a quantum instruction sequence for invoking the quantum function of the second quantum computing device. For instance, the validation service may use the first indication to identify the quantum instruction sequence comprising one or more specific quantum instructions for invoking the quantum function, and may use the second indication to determine appropriate parameters for or constraints on the quantum instructions based on the second quantum computing device's current ability to provide the quantum function. The service definition file in some examples may comprise a QASM file, as a non-limiting example, and may be generated based on a pre-defined format for the service definition file.

The validation service then executes the service definition file using a quantum simulator (e.g., the Qiskit quantum computing framework, as a non-limiting example). Some examples may provide that the validation service executes the service definition file using the quantum simulator by first configuring the quantum simulator to simulate the current operating conditions of the second quantum computing device based on the second indication, and then providing the service definition file as an input to the quantum simulator. The validation service subsequently determines, based on the executing, that the quantum instruction sequence is valid (i.e., that the quantum instruction sequence executes successfully and produces the desired result). The validation service in some examples may determine that the quantum instruction sequence is valid based on a status code provided by the quantum simulator to indicate successful execution, or an expected processing result provided by the quantum simulator upon completing execution of the service definition file. The validation service then stores the quantum instruction sequence as a validated quantum function invocation. In some examples, the validated quantum function invocation may be stored using a storage device or other persistent data store provided by the first quantum computing device.

The operations for generating the validated quantum function invocation may be performed in some examples in response to detecting a change in a configuration of the second quantum computing device. For instance, the validation service may detect or be informed of a change in an availability of a quantum resource (e.g., qubits), a change in an availability of processing resources or processor load, and/or a change in hardware resources of the second quantum computing device, as non-limiting examples. The validation service may then generate the validated quantum function invocation as described above.

The validated quantum function invocation may be used to facilitate development of quantum services and/or applications that employ the quantum function provided by the second quantum computing device. In some examples, the validated quantum function invocation may be used to generate a service definition file template (e.g., a QASM file template or stub) that developers can use as a starting point for developing a quantum service that employs the quantum function provided by the second quantum computing device. Some examples may provide that the validation service may generate a client library for invoking the quantum function of the second quantum computing device based on the validated quantum function invocation. The client library in such examples may comprise a dynamic link library (DLL) or other file that provides an API that can be employed by applications to invoke the quantum function of the second quantum computing device. According to some examples, an Integrated Development Environment (IDE) application may import the validated quantum function invocation and use it to facilitate the writing of quantum services or applications within the IDE application. Thus, for example, the IDE application may detect a user input that corresponds to a portion of the validated quantum function invocation (e.g., a first portion of a quantum instruction of the validated quantum function invocation, indicating to the IDE application that a user is attempting to invoke the quantum function of the second quantum computing device). The IDE application may then autocomplete the user input within the IDE application interface based on the validated quantum function invocation.

FIG. 1 is a block diagram of a quantum computing system 10 according to one example. The quantum computing system 10 includes a first quantum computing device 12 that comprises a first system memory 14, a first processor device 16, and a first storage device 18. The quantum computing system 10 further includes a second quantum computing device 20 that comprises a second system memory 22 and a second processor device 24. The first quantum computing device 12 and the second quantum computing device 20 in the example of FIG. 1 are communicatively coupled via a classical communications link 26, which may comprise a private network or a public network such as the internet. The first quantum computing device 12 and the second quantum computing device 20 are also communicatively coupled to each other and/or to other quantum computing devices (not shown) via a quantum channel 28 over which qubits may be transmitted. It is to be understood that the quantum computing system 10, according to some examples, may include more or fewer quantum computing devices and/or classical computing devices than illustrated in FIG. 1. Additionally, the first quantum computing device 12 and/or the second quantum computing device 20 in some examples may include constituent elements in addition to those illustrated in FIG. 1.

The first quantum computing device 12 and the second quantum computing device 20 in the example of FIG. 1 operate in quantum environments, but are each capable of operating using classical computing principles or quantum computing principles. When using quantum computing principles, the first quantum computing device 12 and the second quantum computing device 20 perform computations that utilize quantum-mechanical phenomena, such as superposition and/or entanglement states. The first quantum computing device 12 and the second quantum computing device 20 may operate under certain environmental conditions, such as at or near zero degrees (0°) Kelvin. When using classical computing principles, the first quantum computing device 12 and the second quantum computing device 20 utilize binary digits that have a value of either zero (0) or one (1).

In the example of FIG. 1, the second quantum computing device 20 executes a quantum service 30, which comprises a process that employs one or more qubits such as the qubits 32(0)-32(Q) to perform quantum operations. The quantum service 30 is defined by a service definition file 34, which comprises quantum programming instructions for allocating and manipulating qubits to achieve a desired functionality. In some examples, the service definition file 34 may comprise a QASM file. Each of the qubits 32(0)-32(Q) of the quantum service 30 may be used to store a data value (not shown), and/or may have a quantum state (not shown) (e.g., spin, as a non-limiting example) into which the qubit 32(0)-32(Q) is programmatically placed.

To maintain information for qubits such as the qubits 32(0)-32(Q), the second quantum computing device 20 provides a qubit registry 36, which comprises a plurality of qubit registry entries (not shown) that each correspond to a qubit. The qubit registry 36 maintains and provides access to data relating to the qubits implemented by the second quantum computing device 20, including a count of the total number of qubits implemented by the second quantum computing device 20, and a count of the number of available qubits that are currently available for allocation, as non-limiting examples. Each of the qubit registry entries of the qubit registry 36 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 30 is facilitated by a quantum task manager 38 and a quantum service scheduler 40, each of which operates in a manner analogous to their conventional classical counterparts. Thus, the quantum task manager 38 of the second quantum computing device 20 handles operations for creating, monitoring, and terminating quantum services. Likewise, the quantum service scheduler 40 of the second quantum computing device 20 controls the scheduling of quantum services for execution by the second processor device 24, and the allocation of processing resources to executing quantum services. The functionality of the quantum task manager 38 and the quantum service scheduler 40 may be made accessible to other services and processes (e.g., via defined APIs, as a non-limiting example). Although not shown in FIG. 1, it is to be understood that the first quantum computing device 12 in some examples also provides functionality corresponding to that of the qubit registry 36, the quantum task manager 38, and the quantum service scheduler 40.

As noted above, development of quantum services such as the quantum service 30 conventionally requires an in-depth understanding of both a programming language such as QASM, as well as the quantum functions provided by the specific quantum computing device on which the quantum service will execute. The quantum functions provided by a particular quantum computing device, and the operations performed to access them, may vary depending on factors such as the manufacturer, the model, the configuration, and/or the current operating status of the quantum computing device, which further complicates development efforts. Accordingly, a mechanism for facilitating rapid and simplified development of quantum services is desirable.

In this regard, examples disclosed herein implement a validation service 42 for generating validated quantum function invocations that may be subsequently used for quantum service development. Assume for purposes of illustration that a developer wishes to produce a quantum service that accesses a quantum function (e.g., a gate manipulation function, a qubit allocation function, a quantum service migration function, a qubit data copying function, a qubit teleportation function, or a qubit entanglement function, as non-limiting examples) provided by the second quantum computing device 20. To facilitate development of the quantum service, the validation service 42 is executed by the first processor device 16 of the first quantum computing device 12. The validation service 42 receives a first indication 44 and a second indication 46 from the second quantum computing device 20. The first indication 44, which may comprise an API or other manifest or menu of quantum functionality provided by the second quantum computing device 20, identifies a quantum function provided by the second quantum computing device 20. The second indication 46 indicates the current ability of the second quantum computing device 20 to provide the quantum function. As such, the second indication 46 may comprise an indication of a current availability of a quantum resource such as the qubits 32(0)-32(Q), a current availability of processing resources or processor load, and/or a current availability of hardware resources of the second quantum computing device 20, as non-limiting examples.

The first indication 44 and/or the second indication 46 may be received in response to a request (not shown) from the first quantum computing device 12 to the second quantum computing device 20, or may retrieved directly by the first quantum computing device 12 from the second quantum computing device 20.

For instance, the validation service 42 may query a quantum operation system (not shown) of the second quantum computing device 20, and/or may query the quantum task manager 38, the qubit registry 36, and/or the quantum service scheduler 40 of the second quantum computing device 20, and may receive the first indication 44 and/or the second indication 46 in response.

The validation service 42 next generates a service definition file 48 based on the first indication 44 and the second indication 46. The service definition file 48 comprises a quantum instruction sequence 50 (i.e., one or more quantum instructions) for invoking the quantum function of the second quantum computing device 20. According to some examples, the validation service 42 may use the first indication 44 to identify the quantum instruction sequence 50 for invoking the quantum function, and may use the second indication 46 to determine appropriate parameters for or constraints on the quantum instruction(s) of the quantum instruction sequence 50 based on the current ability of the second quantum computing device 20 to provide the quantum function. The service definition file 48 in some examples may comprise a QASM file, as a non-limiting example.

After generating the service definition file 48, the validation service 42 executes the service definition file 48 using a quantum simulator 52. The quantum simulator 52 in some examples may comprise the Qiskit quantum computing framework. In some examples, the validation service 42 may execute the service definition file 48 using the quantum simulator 52 by first configuring the quantum simulator 52 to simulate the current operating conditions of the second quantum computing device 20 based on the second indication 46. Thus, for instance, the quantum simulator 52 may be configured with a limited availability of a quantum resource such as the qubits 32(0)-32(Q), a limited availability of processing resources or processor load, and/or a limited availability of hardware resources in a manner that simulates a current operation condition of the second quantum computing device 20. The validation service 42 in such examples may then provide the service definition file 48 as an input to the quantum simulator 52 for execution.

The validation service 42 subsequently determines, based on the executing, that the quantum instruction sequence 50 is valid (i.e., that the quantum instruction sequence 50 executes successfully and produces a desired result). Some examples may provide that the validation service 42 determines that the quantum instruction sequence 50 is valid based on a status code (not shown) provided by the quantum simulator 52 to indicate successful execution, or an expected processing result (not shown) provided by the quantum simulator 52 upon completing execution of the service definition file 48. After determining that the quantum instruction sequence 50 is valid, the validation service 42 stores the quantum instruction sequence 50 as a validated quantum function invocation 54. In some examples, the validated quantum function invocation 54 may be stored using the first storage device 18 or other persistent data store provided by the first quantum computing device 12.

In some examples, the validation service 42 may perform the operations for generating the validated quantum function invocation 54 in response to detecting a change in a configuration of the second quantum computing device 20. Thus, for instance, the validation service 42 may detect or be informed of a change in an availability of a quantum resource (e.g., the qubits 32(0)-32(Q)), a change in an availability of processing resources or processor load, and/or a change in hardware resources of the second quantum computing device 20, as non-limiting examples. The validation service 42 may then generate the validated quantum function invocation 54 as described above.

The validated quantum function invocation 54 may subsequently be used to facilitate development of quantum services and/or applications that employ the quantum function provided by the second quantum computing device 20. Some examples may provide that the validated quantum function invocation 54 is used to generate a service definition file template 56 (e.g., a QASM file template or stub), comprising a partially complete service definition file that includes the quantum instruction sequence 50, that developers can use as a starting point for developing a quantum service that employs the quantum function provided by the second quantum computing device 20. In some examples, the validation service 42 may generate a client library 58 for invoking the quantum function of the second quantum computing device 20 based on the validated quantum function invocation 54. In such examples, the client library 58 may comprise a DLL or other file that provides an API that can be employed by applications to invoke the quantum function of the second quantum computing device 20.

According to some examples, an IDE application 60, executed by a quantum computing device such as the first quantum computing device 12, may import the validated quantum function invocation 54, and use it to facilitate the writing of quantum services or applications within the IDE application 60. For instance, the IDE application 60 may detect a user input 62 (e.g., source code entered by a user) that corresponds to a portion of the validated quantum function invocation 54 (e.g., by matching a first portion of a quantum instruction of the validated quantum function invocation 54, which indicates to the IDE application 60 that the user is attempting to invoke the quantum function of the second quantum computing device 20). The IDE application 60 may then autocomplete the user input 62 within the user interface of the IDE application 60 based on the validated quantum function invocation 54.

It is to be understood that, because the validation service 42 is a component of the first quantum computing device 12, functionality implemented by the validation service 42 may be attributed to the quantum computing system 10 generally. Moreover, in examples where the validation service 42 comprises software instructions that program the first processor device 16 to carry out functionality discussed herein, functionality implemented by the validation service 42 may be attributed herein to the first processor device 16. It is to be further understood that while, for purposes of illustration only, the validation service 42 is depicted as a single component, the functionality implemented by the validation service 42 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
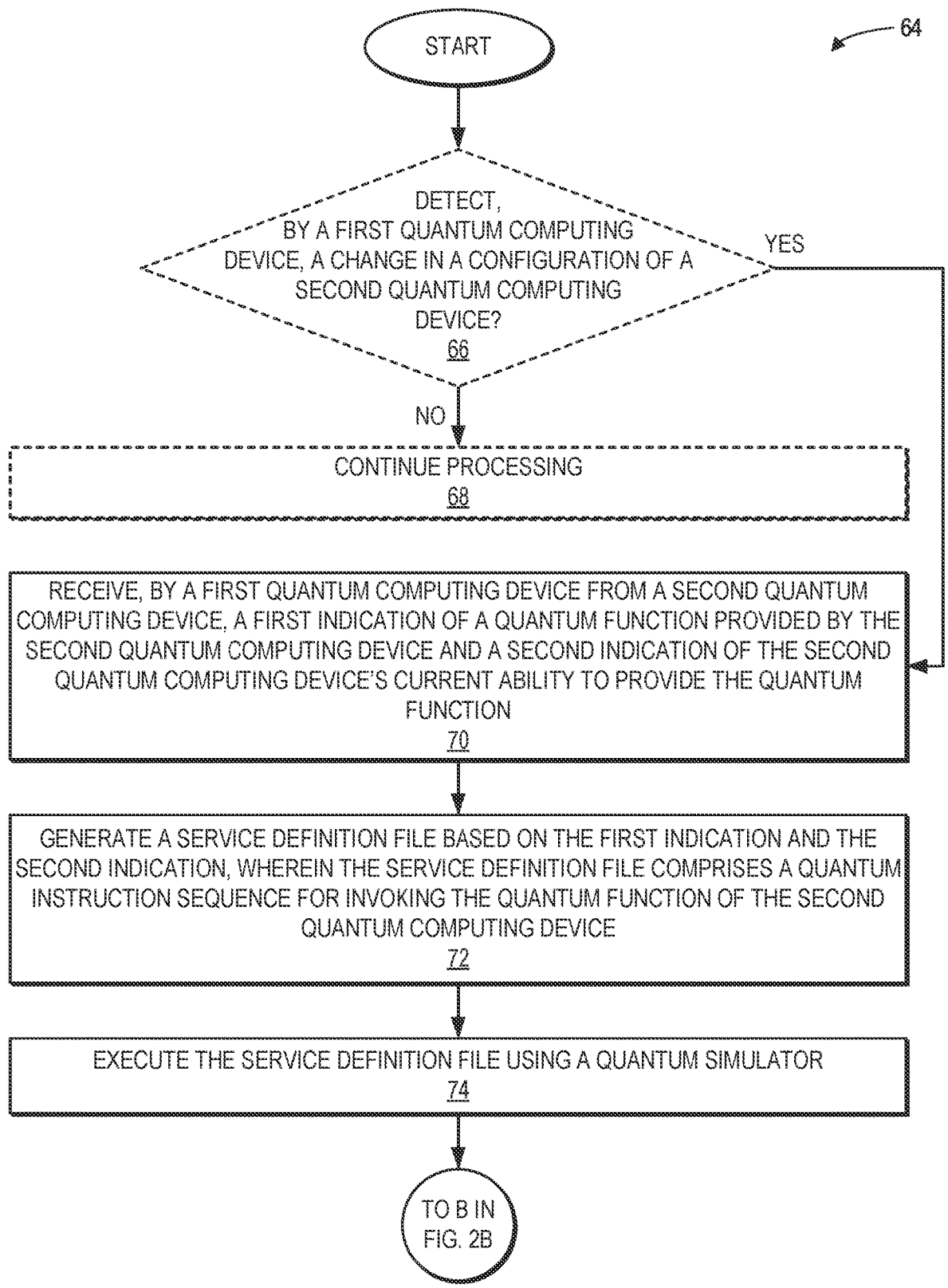
FIGS. 2A-2C are flowcharts illustrating operations performed by the quantum computing system of FIG. 1 for generating validated quantum function invocations, according to one example.
Figure 2B:
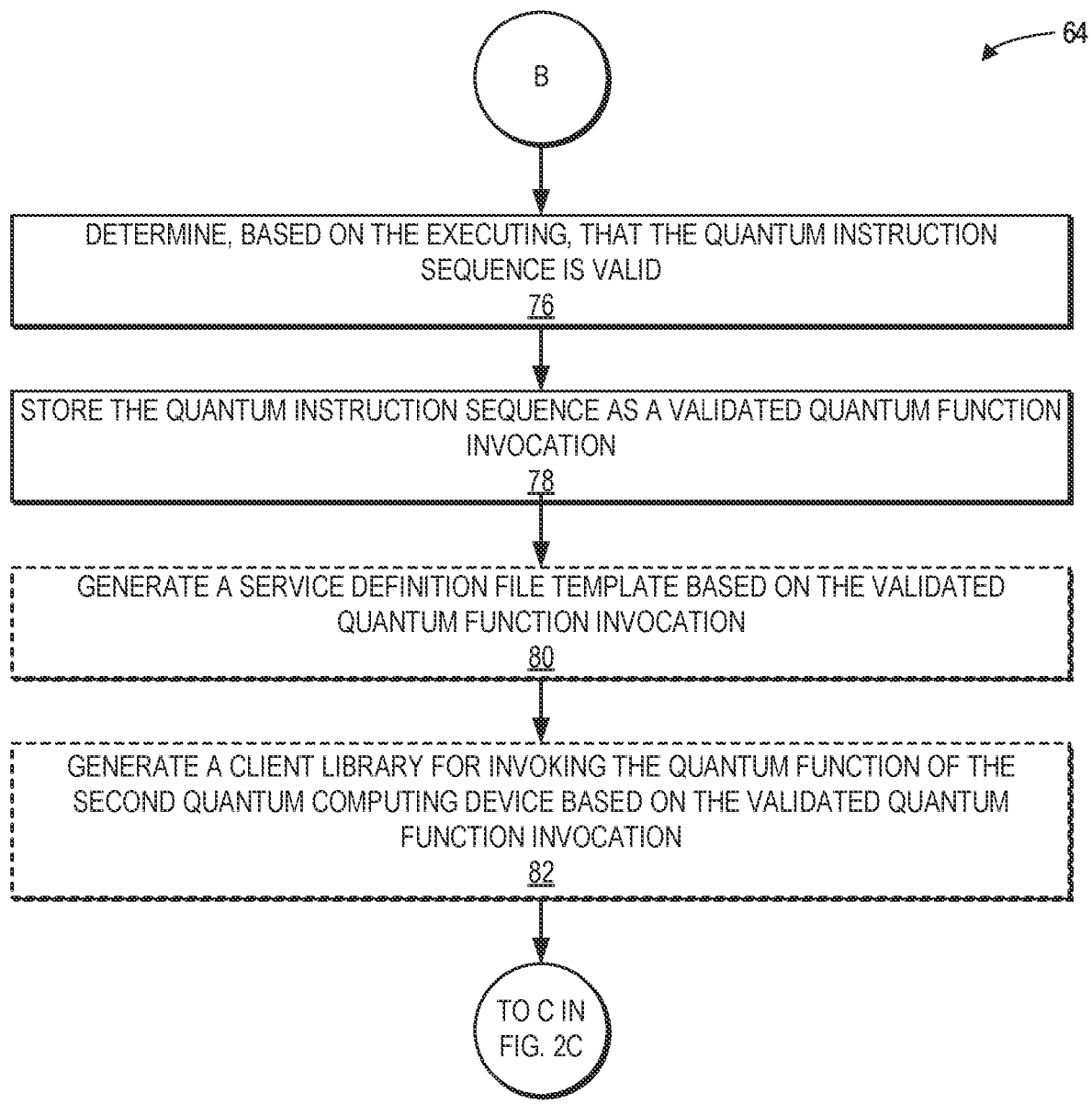
Figure 2C:
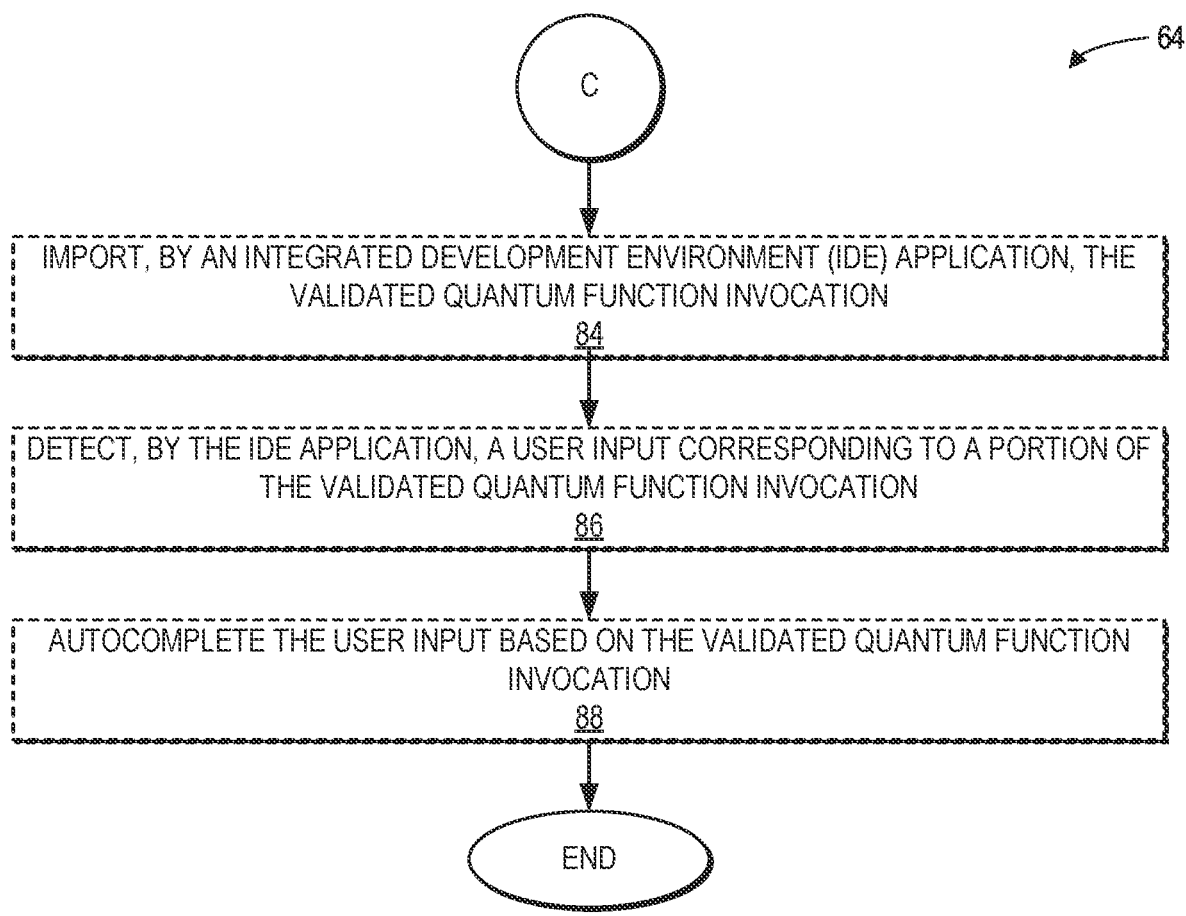

FIGS. 2A-2C provide a flowchart 64 to illustrate exemplary operations performed by the quantum computing system 10 of FIG. 1 for generating validated quantum function invocations according to one example. Elements of FIG. 1 are referenced in describing FIGS. 2A-2C for the sake of clarity. It is to be understood that, in some examples, some operations illustrated in FIGS. 2A-2C may be performed in an order other than illustrated herein, and/or may be omitted. In FIG. 2A, operations in some examples begin with the first processor device 16 of the first quantum computing device 12 (e.g., by executing the validation service 42) detecting a change in a configuration of a second quantum computing device (e.g., the second quantum computing device 20 of FIG. 1) (block 66). The change in the configuration of the second quantum computing device 20 may comprise, e.g., a change in an availability of a quantum resource such as the qubits 32(0)-32(Q), a change in an availability of processing resources or processor load of the second processor device 24, and/or a change in hardware resources of the second quantum computing device 20, as non-limiting examples. If the validation service 42 determines at decision block 66 that there has been no change in the configuration of the second quantum computing device 20, processing continues in conventional fashion (block 68). However, if a change in the configuration of the second quantum computing device 20 is detected at decision block 66, processing continues at block 70 of FIG. 2A.

The validation service 42 of the first quantum computing device 12 receives, from the second quantum computing device 20, a first indication of a quantum function provided by the second quantum computing device 20 and a second indication of the second quantum computing device 20's current ability to provide the quantum function (e.g., the first indication 44 and the second indication 46 of FIG. 1) (block 70). The validation service 42 next generates a service definition file, such as the service definition file 48 of FIG. 1, based on the first indication 44 and the second indication 46, wherein the service definition file 48 comprises a quantum instruction sequence (e.g., the quantum instruction sequence 50 of FIG. 1) for invoking the quantum function of the second quantum computing device 20 (block 72). The validation service 42 then executes the service definition file 48 using a quantum simulator, such as the quantum simulator 52 of FIG. 1 (block 74). Operations then continue at block 76 of FIG. 2B.

Turning now to FIG. 2B, the validation service 42 determines that the quantum instruction sequence 50 is valid based on the executing (block 76). The operations of block 76 for determining that the quantum instruction sequence 50 is valid may be based on, e.g., a status code provided by the quantum simulator 52 to indicate successful execution, or an expected processing result provided by the quantum simulator 52 upon completing execution of the service definition file 48. The validation service 42 then stores the quantum instruction sequence 50 as a validated quantum function invocation (e.g., the validated quantum function invocation 54 of FIG. 1) (block 78).

In some examples, the validation service 42 may subsequently use the validated quantum function invocation 54 to generate a service definition file template (e.g., the service definition file template 56 of FIG. 1) based on the validated quantum function invocation 54 (block 80). The service definition file template 56 may then be used as a starting template for subsequent development of quantum services that employ the validated quantum function invocation 54. Some examples may provide that the validation service 42 may generate a client library, such as the client library 58 of FIG. 1, for invoking the quantum function of the second quantum computing device 20 based on the validated quantum function invocation 54 (block 82). The client library 58 in such examples may provide an API based on the validated quantum function invocation 54 that can be employed by applications to invoke the quantum function of the second quantum computing device 20. Operations in some examples may continue at block 84 of FIG. 2C.

Referring now to FIG. 2C, some examples may provide that an IDE application, such as the IDE application 60 of FIG. 1, may import the validated quantum function invocation 54 (block 84). The IDE application 60 may subsequently detect a user input, such as the user input 62 of FIG. 1, corresponding to a portion of the validated quantum function invocation 54 (block 86). As a non-limiting example, the IDE application 60 may detect that the user input 62 corresponds to a first portion of a quantum instruction of the validated quantum function invocation 54, indicating to the IDE application 60 that a user is attempting to invoke the quantum function of the second quantum computing device 20. In response, the IDE application 60 in such examples may autocomplete the user input 62 based on the validated quantum function invocation 54 (block 88).

Figure 3:
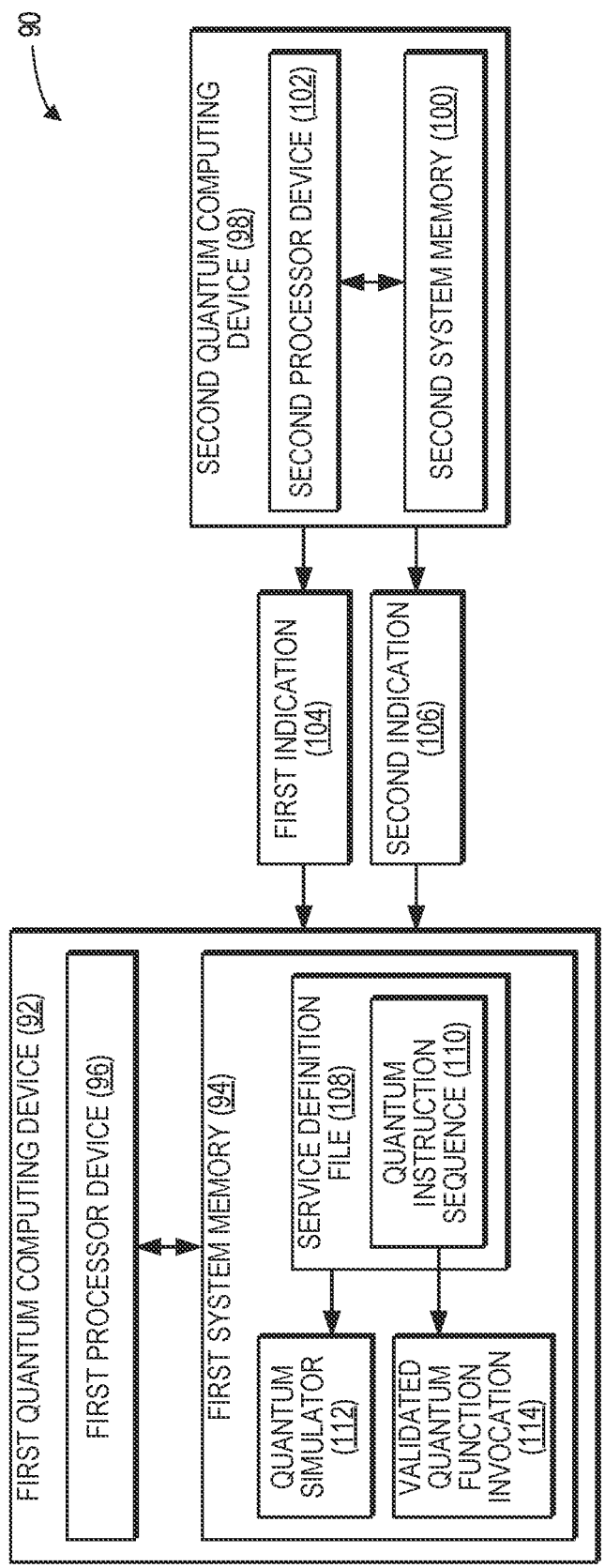
FIG. 3 is a simpler block diagram of the quantum computing system of FIG. 1 for generating validated quantum function invocations, according to one example.

FIG. 3 is a simpler block diagram of the quantum computing system 10 of FIG. 1 for generating validated quantum function invocations, according to one example. In the example of FIG. 3, a quantum computing system 90 includes a first quantum computing device 92 that comprises a first system memory 94 and a first processor device 96. The quantum computing system 90 further includes a second quantum computing device 98 that comprises a second system memory 100 and a second processor device 102. In exemplary operation, the first processor device 96 receives a first indication 104 and a second indication 106 from the second quantum computing device 98. The first indication 104 identifies a quantum function provided by the second quantum computing device 98, while the second indication 106 indicates a current ability of the second quantum computing device 98 to provide the quantum function. The first processor device 96 generates a service definition file 108 comprising a quantum instruction sequence 110 based on the first indication 104 and the second indication 106, and executes the service definition file 108 using a quantum simulator 112. The first processor device 96 subsequently determines, based on the executing, that the quantum instruction sequence 110 is valid, and stores the quantum instruction sequence 110 as a validated quantum function invocation 114.

Figure 4:
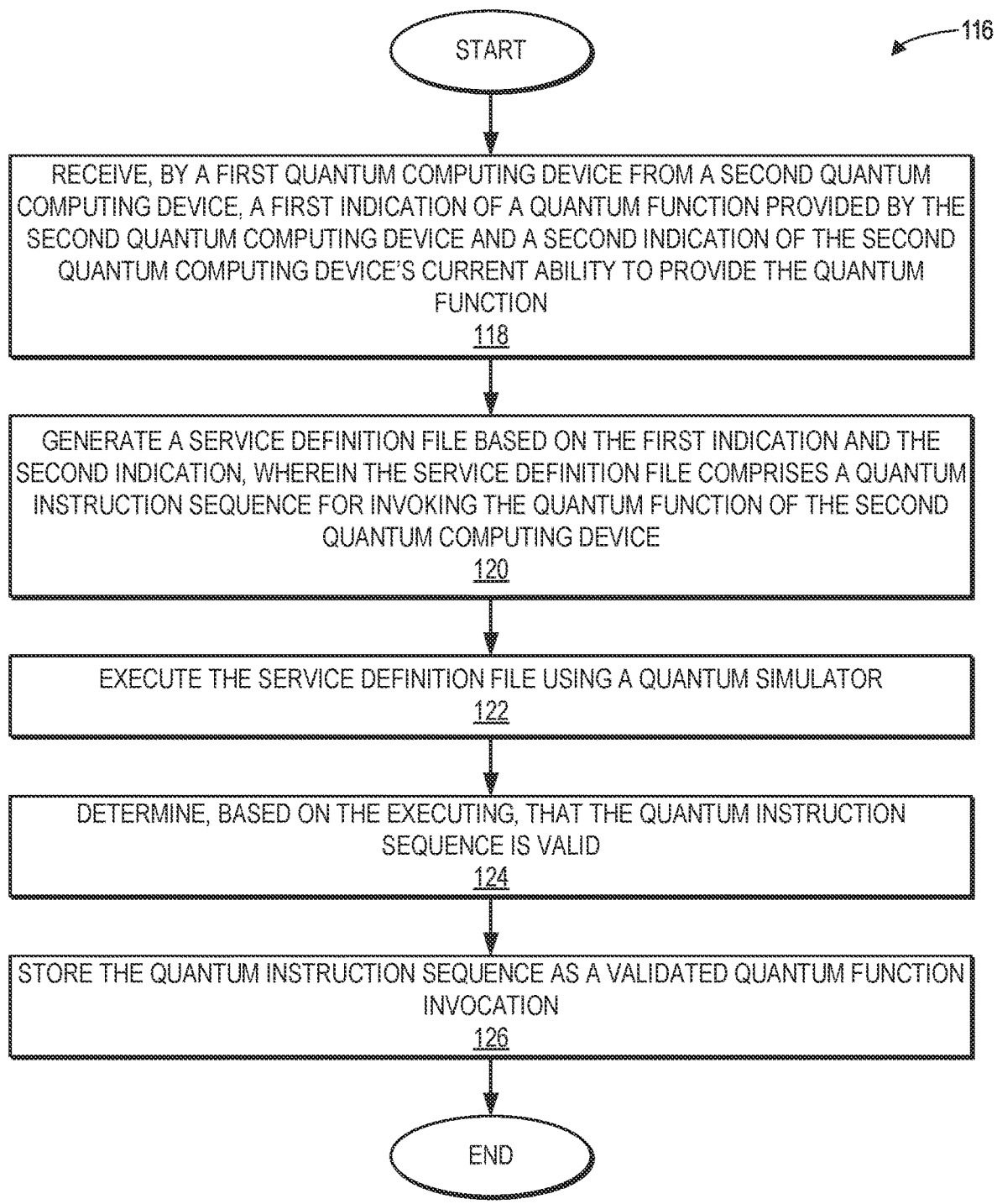
FIG. 4 is a flowchart of a simplified method for generating validated quantum function invocations by the quantum computing device of FIG. 3, according to one example.

To illustrate a simplified method for generating validated quantum function invocations in the quantum computing system 90 of FIG. 3 according to one example, FIG. 4 provides a flowchart 116. Elements of FIG. 3 are referenced in describing FIG. 4 for the sake of clarity. In FIG. 4, operations begin with the first processor device 96 of the first quantum computing device 92 receiving, from the second quantum computing device 98, the first indication 104 of the quantum function provided by the second quantum computing device 98 and the second indication 106 of the second quantum computing device 98's current ability to provide the quantum function (block 118). The first processor device 96 generates the service definition file 108 based on the first indication 104 and the second indication 106, wherein the service definition file 108 comprises the quantum instruction sequence 110 for invoking the quantum function of the second quantum computing device 98 (block 120). The first processor device 96 then executes the service definition file 108 using a quantum simulator 112 (block 122). The first processor device 96 determines, based on the executing, that the quantum instruction sequence 110 is valid (block 124). The first processor device 96 then stores the quantum instruction sequence 110 as the validated quantum function invocation 114 (block 126).

Figure 5:
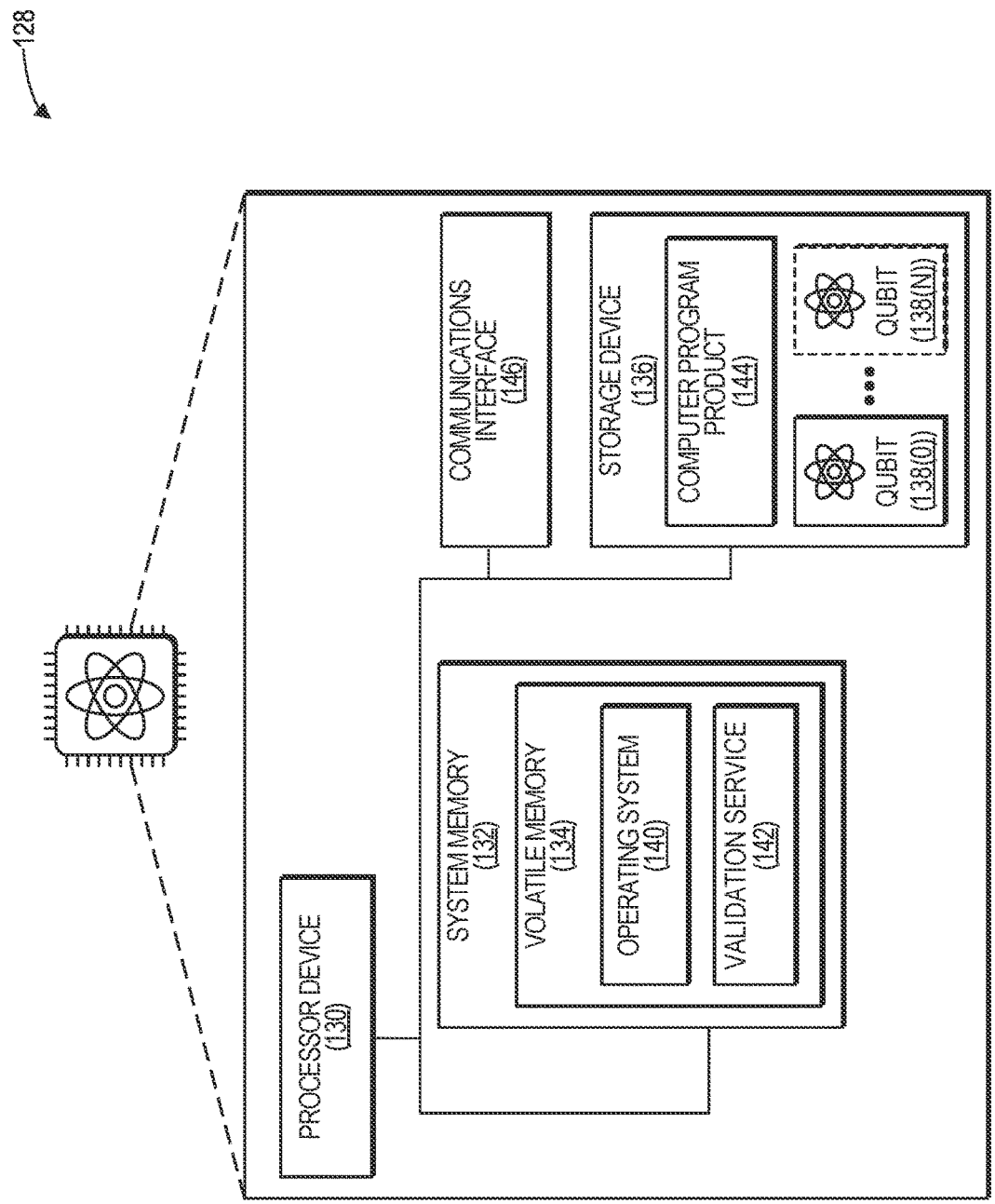
FIG. 5 is a block diagram of a quantum computing device suitable for implementing examples.

FIG. 5 is a block diagram of a quantum computing device 128, such as the first quantum computing device 12 and the second quantum computing device 20 of FIG. 1, suitable for implementing examples according to one example. The quantum computing device 128 may comprise any suitable quantum computing device or devices. The quantum computing device 128 can operate using classical computing principles or quantum computing principles. When using quantum computing principles, the quantum computing device 128 performs computations that utilize quantum-mechanical phenomena, such as superposition and entanglement. The quantum computing device 128 may operate under certain environmental conditions, such as at or near zero degrees (0°) Kelvin. When using classical computing principles, the quantum computing device 128 utilizes binary digits that have a value of either zero (0) or one (1).

The quantum computing device 128 includes a processor device 130 and a system memory 132. The processor device 130 can be any commercially available or proprietary processor suitable for operating in a quantum environment. The system memory 132 may include volatile memory 134 (e.g., random-access memory (RAM)). The quantum computing device 128 may further include or be coupled to a non-transitory computer-readable medium such as a storage device 136. The storage device 136 and other drives associated with computer-readable media and computer-usable media may provide non-volatile storage of data, data structures, computer-executable instructions, and the like. The storage device may also provide functionality for storing one or more qubits 138(0)-138(N).

A number of modules can be stored in the storage device 136 and in the volatile memory 134, including an operating system 140 and one or more modules, such as a validation service 142. All or a portion of the examples may be implemented as a computer program product 144 stored on a transitory or non-transitory computer-usable or computer-readable medium, such as the storage device 136, which includes complex programming instructions, such as complex computer-readable program code, to cause the processor device 130 to carry out the steps described herein. Thus, the computer-readable program code can comprise computer-executable instructions for implementing the functionality of the examples described herein when executed on the processor device 130.

An operator may also be able to enter one or more configuration commands through a keyboard (not illustrated), a pointing device such as a mouse (not illustrated), or a touch-sensitive surface such as a display device (not illustrated). The quantum computing device 128 may also include a communications interface 146 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method for generating validated quantum function invocations confirmed to successfully execute in a simulated quantum environment, comprising:
    receiving, by a first quantum computing device from a second quantum computing device, a first indication of a quantum function provided by the second quantum computing device and a second indication of the second quantum computing device's current ability to provide the quantum function;
    generating a service definition file based on the first indication and the second indication, wherein the service definition file comprises a quantum instruction sequence for invoking the quantum function of the second quantum computing device;
    executing the service definition file using a quantum simulator;
    determining, based on the executing, that the quantum instruction sequence is valid;
    storing the quantum instruction sequence as a validated quantum function invocation; and
    generating a service definition file template based on the validated quantum function invocation, the service definition file template to be used as a partially complete service definition file for developing a quantum service with an autocompleting function that employs the validated quantum function invocation.

2. The method of claim 1, further comprising detecting, by the first quantum computing device, a change in a configuration of the second quantum computing device;
    wherein receiving the first indication and the second indication is responsive to detecting the change in the configuration of the second quantum computing device.

3. The method of claim 1, further comprising generating a client library for invoking the quantum function of the second quantum computing device based on the validated quantum function invocation.

4. The method of claim 1, further comprising:
    importing, by an Integrated Development Environment (IDE) application, the validated quantum function invocation;
    detecting, by the IDE application, a user input corresponding to a portion of the validated quantum function invocation; and
    autocompleting the user input based on the validated quantum function invocation.

5. The method of claim 1, wherein the service definition file comprises a Quantum Assembly (QASM) file.

6. The method of claim 1, wherein the quantum function provided by the second quantum computing device comprises a gate manipulation function, a qubit allocation function, a quantum service migration function, a qubit data copying function, a qubit teleportation function, or a qubit entanglement function.

7. The method of claim 1, wherein the quantum simulator comprises a Qiskit quantum computing framework.

8. The method of claim 1, further comprising configuring the quantum simulator to simulate current operating conditions of the second quantum computing device based on the second indication.

9. A quantum computing system for generating validated quantum function invocations confirmed to successfully execute in a simulated quantum environment, comprising a first quantum computing device comprising:
- a first system memory; and
- a first processor device communicatively coupled to the first system memory, the first processor device to:
  - receive, from a second quantum computing device, a first indication of a quantum function provided by the second quantum computing device and a second indication of the second quantum computing device's current ability to provide the quantum function;
  - generate a service definition file based on the first indication and the second indication, wherein the service definition file comprises a quantum instruction sequence for invoking the quantum function of the second quantum computing device;
  - execute the service definition file using a quantum simulator;
  - determine, based on the executing, that the quantum instruction sequence is valid;
  - store the quantum instruction sequence as a validated quantum function invocation; and
  - generate a service definition file template based on the validated quantum function invocation, the service definition file template to be used as a partially complete service definition file for developing a quantum service with an autocompleting function that employs the validated quantum function invocation.

10. The quantum computing system of claim 9, wherein the first processor device is further to detect a change in a configuration of the second quantum computing device;
  - wherein to receive the first indication and the second indication is to receive the first indication and the second indication responsive to detecting the change in the configuration of the second quantum computing device.

11. The quantum computing system of claim 9, wherein the first processor device is further to generate a client library for invoking the quantum function of the second quantum computing device based on the validated quantum function invocation.

12. The quantum computing system of claim 9, wherein the first processor device is further to:
  - import, using an Integrated Development Environment (IDE) application, the validated quantum function invocation;
  - detect, using the IDE application, a user input corresponding to a portion of the validated quantum function invocation; and
  - autocomplete the user input based on the validated quantum function invocation.

13. The quantum computing system of claim 9, wherein the service definition file comprises a Quantum Assembly (QASM) file.

14. The quantum computing system of claim 9, wherein the quantum function provided by the second quantum computing device comprises a gate manipulation function, a qubit allocation function, a quantum service migration function, a qubit data copying function, a qubit teleportation function, or a qubit entanglement function.

15. The quantum computing system of claim 9, wherein the quantum simulator comprises a Qiskit quantum computing framework.

16. The quantum computing system of claim 9, wherein the first processor device is further to configure the quantum simulator to simulate current operating conditions of the second quantum computing device based on the second indication.

17. A non-transitory computer-readable medium having stored thereon computer-executable instructions that, when executed, cause one or more processor devices to:
  - receive, by a first quantum computing device from a second quantum computing device, a first indication of a quantum function provided by the second quantum computing device and a second indication of the second quantum computing device's current ability to provide the quantum function;
  - generate a service definition file based on the first indication and the second indication, wherein the service definition file comprises a quantum instruction sequence for invoking the quantum function of the second quantum computing device;
  - execute the service definition file using a quantum simulator;
  - determine, based on the executing, that the quantum instruction sequence is valid;
  - store the quantum instruction sequence as a validated quantum function invocation; and
  - generate a service definition file template based on the validated quantum function invocation, the service definition file template to be used as a partially complete service definition file for developing a quantum service with an autocompleting function that employs the validated quantum function invocation.

18. The non-transitory computer-readable medium of claim 17, wherein the computer-executable instructions further cause the one or more processor devices to detect a change in a configuration of the second quantum computing device;
  - wherein to receive the first indication and the second indication is to receive the first indication and the second indication responsive to detecting the change in the configuration of the second quantum computing device.

19. The non-transitory computer-readable medium of claim 17, wherein the computer-executable instructions further cause the one or more processor devices to generate a client library for invoking the quantum function of the second quantum computing device based on the validated quantum function invocation.

20. The non-transitory computer-readable medium of claim 17, wherein the computer-executable instructions further cause the one or more processor devices to configure the quantum simulator to simulate current operating conditions of the second quantum computing device based on the second indication.

* * * * *